US009160405B1

United States Patent
Vareljian et al.

(10) Patent No.: US 9,160,405 B1
(45) Date of Patent: Oct. 13, 2015

(54) SELF-TUNING HIGH SPEED TRANSCEIVER FOR IC WIRELINE CHANNEL

(75) Inventors: Albert Vareljian, Folsom, CA (US); William W. Bereza, Nepean (CA); Rakesh H. Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1098 days.

(21) Appl. No.: 12/425,216

(22) Filed: Apr. 16, 2009

(51) Int. Cl.
*H03D 1/00* (2006.01)
*H03K 5/159* (2006.01)
*H04B 3/32* (2006.01)
*H04B 3/23* (2006.01)
*H04L 25/03* (2006.01)

(52) U.S. Cl.
CPC .............. *H04B 3/32* (2013.01); *H04B 3/235* (2013.01); *H04B 3/237* (2013.01); *H04L 25/03057* (2013.01); *H04L 2025/03617* (2013.01)

(58) Field of Classification Search
CPC ............ H04B 3/20; H04B 3/23; H04B 3/235; H04B 3/237; H04B 3/32; H04L 25/03057; H04L 2025/03617
USPC ......... 375/219, 220, 222–233, 257, 285, 346, 375/350, 340, 349; 370/201
See application file for complete search history.

(56) References Cited

U.S. PATENT DOCUMENTS

| | | | |
|---|---|---|---|
| 5,181,198 A * | 1/1993 | Lechleider | 370/286 |
| 5,390,216 A | 2/1995 | Bilitza et al. | |
| 6,075,814 A | 6/2000 | Yamano et al. | |
| 6,236,645 B1 * | 5/2001 | Agazzi | 370/286 |
| 6,477,200 B1 | 11/2002 | Agazzi et al. | |
| 6,866,544 B1 * | 3/2005 | Casey et al. | 439/607.2 |
| 6,959,167 B1 * | 10/2005 | Dehandschutter | 455/1 |
| 7,327,819 B2 * | 2/2008 | Lin et al. | 375/375 |
| 7,342,982 B2 * | 3/2008 | Lin et al. | 375/350 |
| 7,523,215 B1 * | 4/2009 | Robinson et al. | 709/236 |
| 7,826,568 B2 * | 11/2010 | Sommer et al. | 375/346 |
| 7,843,859 B1 * | 11/2010 | Gregorian et al. | 370/290 |
| 8,654,898 B2 | 2/2014 | Bereza et al. | |
| 8,891,601 B2 * | 11/2014 | Huang et al. | 375/222 |
| 2001/0035994 A1 | 11/2001 | Agazzi et al. | |
| 2002/0027953 A1 * | 3/2002 | Hwang et al. | 375/232 |
| 2003/0138038 A1 * | 7/2003 | Greiss et al. | 375/232 |
| 2004/0008794 A1 | 1/2004 | McClellan | |
| 2005/0152479 A1 | 7/2005 | Bulow et al. | |

(Continued)

FOREIGN PATENT DOCUMENTS

EP 1006697 A2 6/2000
WO WO2005071848 8/2005

OTHER PUBLICATIONS

Grimble et al. "Principles of Adaptive Filters and Self-learning Systems Advanced Textbooks in Control and Signal Processing" 2005, pp. 227-228.*

(Continued)

*Primary Examiner* — Sophia Vlahos
(74) *Attorney, Agent, or Firm* — Mauriel Kapouytian Woods LLP; Ararat Kapouytian

(57) ABSTRACT

Apparatus and methods are described for space-efficient, high-speed data communications for integrated circuits. Bandwidth is multiplied by using multiple individual wireline communications channels coupled to form a communications lane. The data receiver for a channel implements symbol-rate equalization and crosstalk filtering that is space efficient, allowing high-speed data communications to be added as an ancillary function to an IC.

21 Claims, 4 Drawing Sheets

(56) References Cited

U.S. PATENT DOCUMENTS

| | | |
|---|---|---|
| 2005/0271137 A1 | 12/2005 | Kolze et al. |
| 2006/0046580 A1* | 3/2006 | Ankerstjerne ................ 439/713 |
| 2006/0274861 A1 | 12/2006 | Langenbach et al. |
| 2007/0041455 A1 | 2/2007 | Tran et al. |
| 2007/0280388 A1* | 12/2007 | Torre et al. .................... 375/350 |
| 2008/0101510 A1 | 5/2008 | Agazzi |
| 2009/0113504 A1 | 4/2009 | Jackson et al. |
| 2010/0226421 A1 | 9/2010 | Kibune |

OTHER PUBLICATIONS

Bae, H.-M., et al., "An MLSE Receiver for Electronic Dispersion Compensation of OC-192 Fiber Links," IEEE Journal of Solid-State Circuits, vol. 41, No. 11, pp. 2541-2554 (Nov. 2006).

* cited by examiner

SELF-TUNING HIGH SPEED TRANSCEIVER FOR IC WIRELINE CHANNEL

BACKGROUND

Advances in semiconductor technology have brought electronic devices with continually higher operating speeds and a concomitant need for faster communication channels to transport data among these devices. Many technological advances and solutions have resulted from efforts to maximize the speed and quality of these communication channels as their increasing speeds have introduced new challenges. For example, higher frequencies increase the impact of the skin effect in physical conductors and dielectric losses in insulation material.

High-speed serial (HSS) links that convey a data signal from end to end using a wireline have grown in popularity as a worthwhile communications channel. The great variability in the physical composition and construction of individual wirelines, and other factors, have resulted in sophisticated transceiver circuits that can dynamically adapt to actual operating conditions, maximizing the rate at which data can be reliably received. The sophistication of these transceivers, however, generally requires a large amount of circuitry capable of occupying the entire area of an integrated circuit (IC) die. Accordingly, these solutions cannot be practically employed where high-speed serial communication is only ancillary to the principal purpose of the chip.

Moreover, multiple communication channels may be operated in tandem as a unified communication lane to support data transfer rates beyond the capability of a single channel. The increased data rates brought by coupling the data capacity of multiple channels brings with it the increased likelihood of signal cross coupling between the channels. Left unaddressed, this cross-coupled interfering noise reduces the potential maximum data rate at which each individual channel can receive data reliably. The problem with crosstalk from co-located transmitters at the receiver input takes on increasing significance as channel frequencies move from the sub gigahertz range to 6 GHz, 10 GHz, and beyond.

As a further complication, the move to higher and higher frequencies presents new signal reliability challenges to wireline (i.e., solid conductor) data transmission on wirelines measured in inches, or that may be wholly contained within the confines of a single IC die.

SUMMARY

The inventive subject matter presented herein addresses the need to provide reliable, high-speed, wireline data communication for multi-channel communications lanes as an ancillary function on an IC chip. Practice of inventive subject matter results in ICs, circuit cards, backplane systems, and complete electronic devices and apparatus with high performance, high reliability, and low manufacturing cost.

In one embodiment, a receiver portion of a transceiver circuit includes adaptive filters to correct for far-end crosstalk from other channels in the lane. The filters operate on data symbols received on the other channels. Operation of the filters in this embodiment at near symbol-rate speed allows for an economical silicon implementation.

Another embodiment includes the same far-end crosstalk filtering to provide correctional information used to make a soft decision about a received symbol in the immediate channel. This embodiment adds a correctional signal to the soft decision inputs, from an adjustable feed-back equalizer. The feed-back equalizer uses hard receive symbol decisions made in the immediate channel to provide its correctional signal output.

Yet another embodiment includes the same far-end crosstalk filtering and feed-back equalization mentioned above. This embodiment further provides a sampled receive symbol signal that is the principal basis for the soft decision incorporating the aforementioned correctional signals. This sampled receive symbol signal in this embodiment benefits from processing by a feed-forward adjustable equalizer. The soft receive symbol decision information is processed by a slicer block to produce hard decision information for a received symbol. Soft and hard decision information is processed by a timing recovery block to achieve receiver synchronization with the far-end transmitter and adjust the optimum sampling phase. Soft and hard decision information is also processed by additional circuitry function to provide adaptive control information for the aforementioned adjustable equalization and filter functions.

These and other embodiments will become apparent to one of skill in the art by consideration of the drawings and the detailed description that follows.

The same reference identifier is used for the same item appearing in multiple figures.

DETAILED DESCRIPTION

The detailed description that follows makes use of illustrative embodiments to assist the development of an understanding of inventive subject matter such as that set forth in the claims. Details of these embodiments, including those depicted in the figures, are provided as examples and as an aid to understanding, and do not set forth limitations for the many and various embodiments that may practice inventive subject matter. Further, unnecessary detail understood by one of skill in the art is omitted in order not to obscure an understanding of the novel technological advancements.

Figure 1:
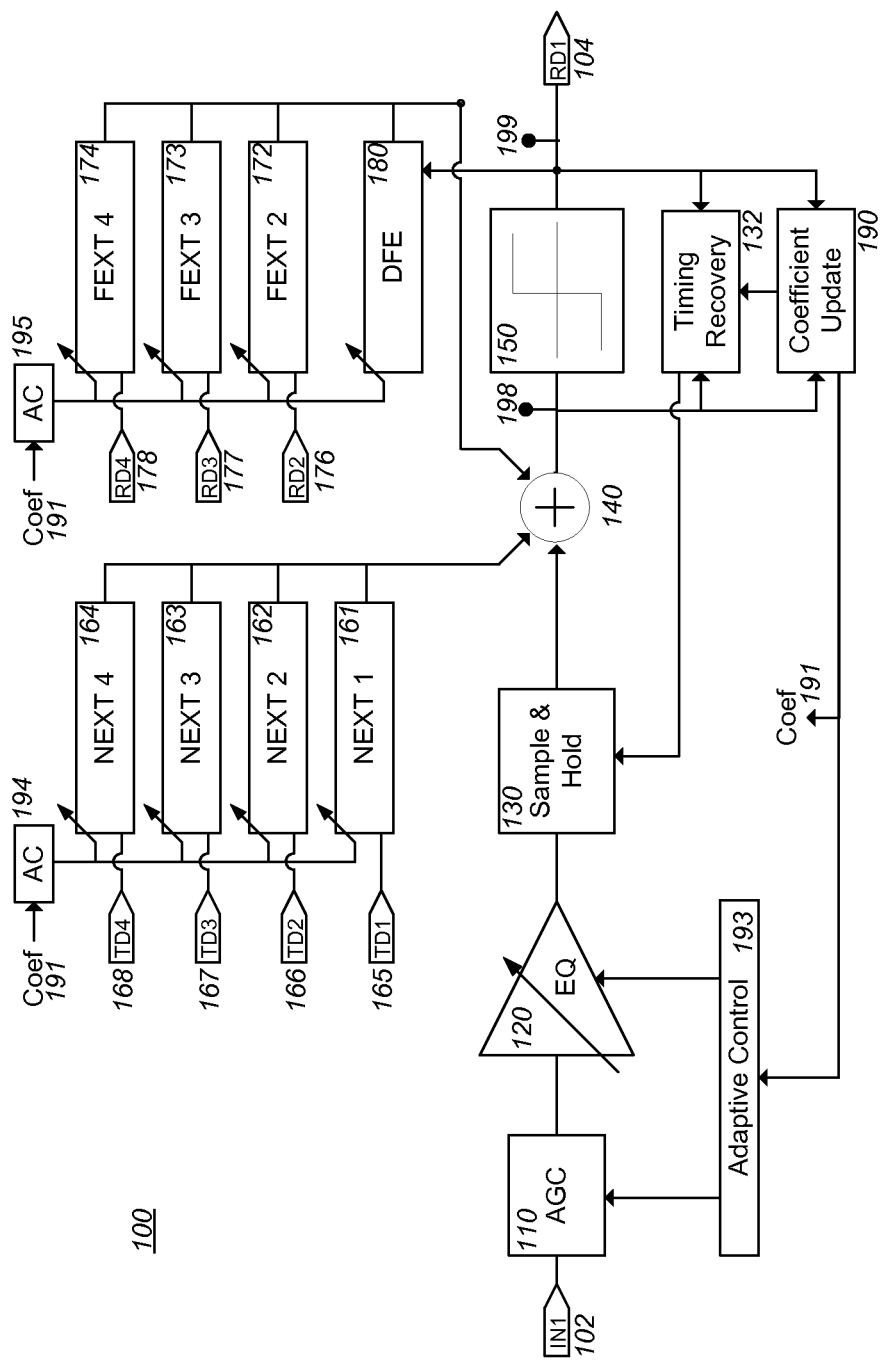
FIG. 1 is a functional circuit diagram of a mixed signal receiver embodiment.

FIG. 1 is a functional circuit diagram of a mixed signal receiver embodiment. The receiver circuit portion of a data transceiver shown in FIG. 1 can be implemented with a modest silicon footprint to provide ancillary data communication function for an integrated circuit design having other principal functionality. Many types of integrated circuits can benefit from this transceiver functionality. For example, programmable logic devices (PLDs) such as FPGAs and CPLDs may include this functionality to provide user designs easy mechanisms for high-speed, reliable wireline communications according to user needs. A transceiver of this embodiment, by its self-adjusting aspects, can serve a broad range of communication requirements including, for example, chip-to-chip communication on a printed circuit board or card-to-card communication across a backplane. For another example, large system-on-a-chip (SOC) ICs may include this transceiver functionality to provide reliable, high-speed communication between function blocks on the IC, in addition to providing the types of off-chip communications illustrated by preceding examples.

FIG. 1 specifically illustrates a receiver embodiment for a single channel transceiver coupleable with up to three others to implement a multichannel communications lane. The coupling of the multiple transceivers may be selectable. For example, a group of four transceivers may have circuitry to selectively couple them into a configuration of four single channel transceivers, or two 2-channel lanes, or one 4-channel lane. The coupling of the multiple transceivers may, of course, also be fixed. The embodiment of FIG. 1 is illustrated as supporting a 4-channel lane and will be discussed as such. While FIG. 1 specifically illustrates support for four channels, that number can be expanded or contracted as is readily within the scope of one of skill in the art after developing an understanding of the circuit illustrated.

Figure 2:
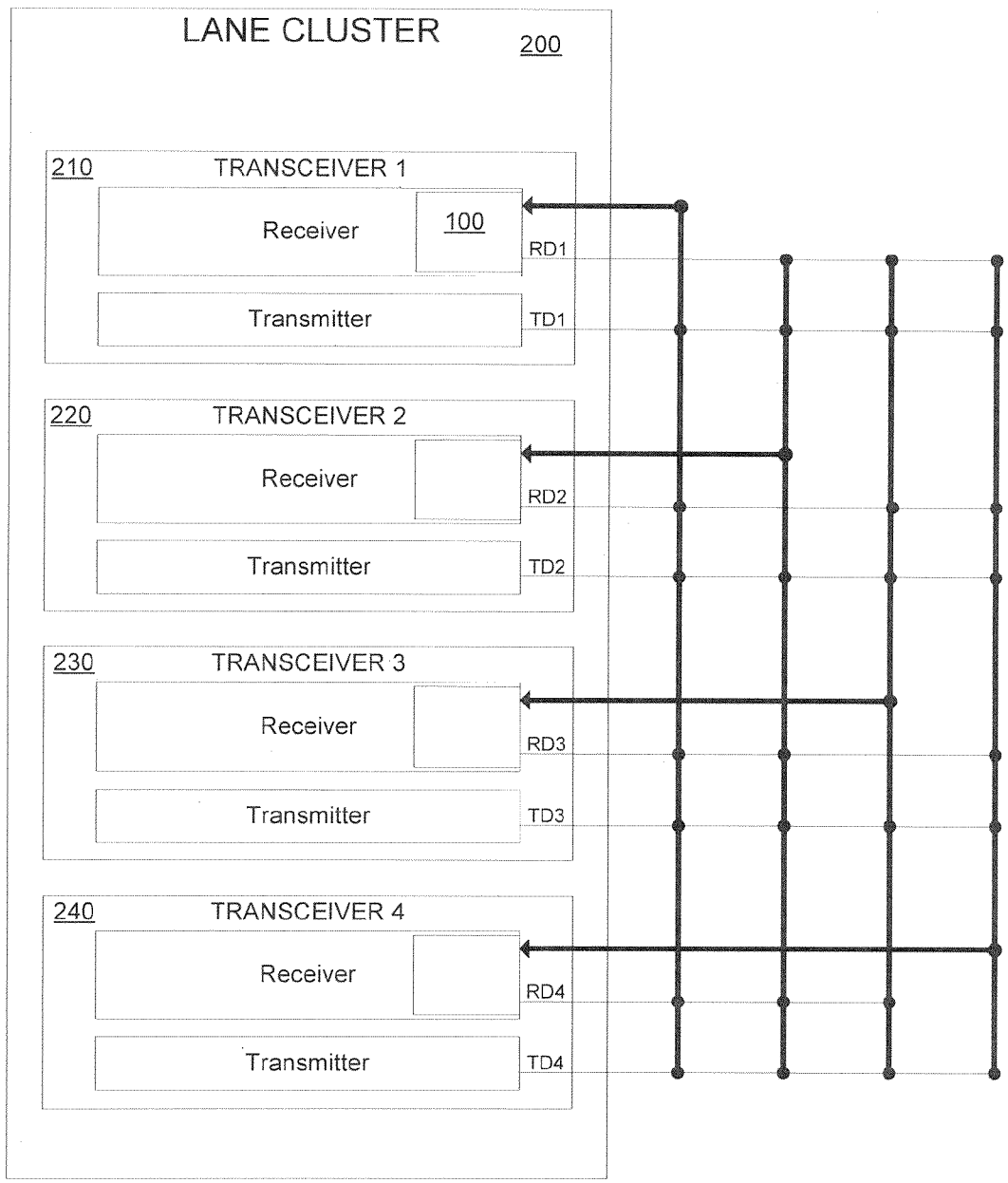
FIG. 2 is a block diagram of a lane cluster.

FIG. 2 is a block diagram of a lane cluster and illustrates the illustrative context for the receiver circuit portion 100 of FIG. 1. FIG. 2 shows four transceivers 210-240 clustered together to provide a 4-channel communication lane. The transceiver cluster occupies a proportionally small footprint on an IC die to provide ancillary communication capability to other principal functional circuitry (not shown). Each transceiver has a receiver circuit and a transmitter circuit. The receiver circuit of the transceiver 210 for channel 1 includes receiver circuit portion 100 and may include other circuitry as well. FIG. 2 illustrates cross-connections among the transceivers that facilitate advanced receiver operation. Each receiver is shown connected to the transmit data (TD) signals from the transmitters of all four transceivers in the cluster. Each receiver also connects to the receive data (RD) signals from the receiver section of each of the other three transceivers in the cluster.

In one IC embodiment where transceiver functionality is ancillary to programmable logic functionality provided by, for example, FPGA circuitry, the transceiver circuitry consumes preferably about 5% or less of the main chip area occupied by the transceiver and programmable logic circuitry together—less preferably as much as about 10%, and even less preferably as much as about 15%. Transceiver circuits illustrating novel aspects providing high performance in small space are subsequently discussed that make meaningful numbers of transceivers possible with the percentages of ancillary die space suggested. In large FPGA chips using chip manufacturing processes currently in widespread commercial use, such an ancillary die space percentage may provide up to 20 or more individual transceivers that could be variously configured to provide multi-channel communication lanes—a ratio of communication channels to principal logic functional circuitry capable of supporting a large number of chip applications.

Returning to FIG. 1, the illustrated receiver circuit portion 100 receives an input signal at input 102. Input 102 may be a single or multi-wire input and is, in operation, coupled to a wireline presenting an inbound data signal (i.e. the outbound, or transmission, data signal from a far-end transmitter/transceiver). The inbound data signal represents data for one channel in a multichannel communications lane (a lane channel) and the receiver circuit portion operates to receive the data signal for this one channel (the receiver channel). The inbound data signal is processed by automatic gain control (AGC) 110 to adjust the signal level for subsequent processing to extract the symbols present in the data signal. The adjusted output signal of AGC 110 is presented to the input of adaptive equalizer (EQ) 120. Adaptive equalizer 120 adjusts the signal to offset or compensate for dissimilar effects on various component parts of the transmitted signal resulting from transmission across the wireline. Equalizer 120 presents its improved signal, more faithfully representing the originally transmitted signal, to sample and hold circuit 130. Sample and hold circuit 130 captures the value of the continuous signal from equalizer 120 at the points in time signaled by timing recovery circuit 132. Sample and hold circuit 130 then presents the captured signal value to summing node circuitry 140.

Summing node 140 combines the outputs from nine different sources to produce a single output in this embodiment. The output 198 of summing node 140 represents a soft decision regarding the received symbol value. The soft symbol value (e.g., at 198) is directed to slicer 150. The operation of a summing node in an embodiment is not restricted to purely the mathwise addition of its inputs as the name may suggest. Weighted summing or any other operations may be used that combine the inputs in a desired way to produce the soft symbol decision value. Analog and/or digital circuitry can, of course, be used to implement the summing node, with a single common connection point being a straightforward analog implementation.

Slicer 150 is so named because it views the entire range of possible soft symbol values as can be presented by summing node 140 as a number of slices (or subranges), with each slice corresponding to a particular hard symbol value. Slicer 150 presents the hard symbol value that corresponds to the slice to which the soft symbol value at its input belongs, at its output (e.g., at 199). The hard symbol value (e.g., at 199) is presented as the receive data (symbol) value for the channel at receiver output 104.

Soft symbol value 198 and hard symbol value 199 are both inputs to each of timing recovery circuit 132 and coefficient update circuit function 190. Coefficient update block 190 provides information 191 to other circuitry reflecting recent symbol reception characteristics. The information 191 from coefficient update 190 is used by other circuitry to adapt receiver operation to current conditions. For example, timing recovery block 132 uses information received from coefficient update block 190 to advance or retard as necessary the signal sent to sample and hold circuit 130 to control sample timing. A sine-sine coefficient update is one of many approaches that may be employed (see, for example, Adaptive Signal Processing, Bernard Widrow and Samuel Steams, Prentice-Hall, 1985). Timing recovery block 132 is coupled (via summing node 140) with the feed-forward (120) and feed-back (180) equalization filters that operate conjointly to achieve receiver synchronization the with the far-end transmitter, adjust the optimum sampling phase and mitigate the channel frequency-dependent loss all with one goal of minimizing the error at the hard decision device (slicer 150). Here, Mueller-Muller timing recovery approach can be employed (see, for example, "Timing recovery in Digital Synchronous Data Receivers," Mueller and Muller, IEEE Transactions on Communications May 1976). The symbol rate clock signal output by Timing Recovery 132 closely approximates the nominal data symbol rate for the channel with the expected design, operational, and corrective deviations.

Information 191 from coefficient update 190 is also used by adaptive control 193 to effect adjustments in the operation of AGC 110 and equalizer 120, by adaptive control 194 to effect adjustments in the operation of the NEXT filters 1-4 (161-164), and by adaptive control 195 to effect adjustments in the operation of FEXT filters 2-4 (172-174) and DFE 180. (The circuitry of coefficient update block 198 and adaptive control blocks 193-195 can, of course, be organized and distributed in various ways within an integrated circuit and their specific appearance in FIG. 1, as with other blocks, serves the purposes of simplifying illustration.)

As mentioned earlier, the output of sample and hold circuit 130 is an input to summing node 140. Summing node 140 receives four other input signals from adaptive filters NEXT1 to NEXT4 (161-164). A NEXT filter is a Near End cross(X) Talk filter. The NEXT filter operates on the co-located transmit symbols and adapts its output to minimize the error at slicer 150 by compensating the correlated interference coupled to the receiver input from the respective co-located transmitters. Each of filters NEXT1-NEXT4 (161-164) shown in the embodiment of FIG. 1 is dynamically adaptable in its operation and accordingly shows an adjustment input shown in FIG. 1 receiving a control information signal from adaptive control block 194. Each of NEXT filters 161-164 is also shown to have an input to receive signals 165-168, respectively representing data transmitted from one of the transceivers in the lane cluster of which receiver circuit 100 is a part, i.e., a co-located transmit symbol signal. The NEXT filters 161-164 of FIG. 1 implement a finite impulse response (FIR) function. Other filter functions to address cross talk may be used and may vary from embodiment to embodiment.

Summing node 140 receives three other input signals from adaptive filters FEXT2 to FEXT4 (172-174). A FEXT filter is a Far End cross(X)Talk filter. The FEXT filter operates on the adjacent receiver detected symbols (hard symbol value decisions). Each of filters FEXT2-FEXT4 (172-174) shown in the embodiment of FIG. 1 is dynamically adaptable in its operation and accordingly shows an adjustment input shown in FIG. 1 receiving a control information signal from adaptive control block 195. Each of FEXT filters 172-174 is also shown to have an input to receive data symbol information 176-178, respectively from one of the transceivers, other than its own, in the lane cluster of which receiver circuit 100 is a part. The FEXT filters 172-174 of FIG. 1 implement a finite impulse response (FIR) function. Other filter functions to address cross talk may be used and may vary from embodiment to embodiment.

Notably, FEXT cancellation by circuit 100 is performed by analyzing hard decisions about symbols in adjacent channels. This represents a relatively small amount of data as compared with performing FEXT cancellation at an early stage in the receiver circuit where dealing with a continuous signal or a large volume of quantized data representing the same. The reduced volume and rate of data seen by the FEXT filters of circuit 100 is a major factor contributing to the simplicity of the circuitry needed for FEXT cancellation and the associated die space savings. While the symbol-rate FEXT cancellation as described here for circuit 100 may experience a decline in effectiveness where there is a considerable increase in delay skew amongst the propagation times for the lane channels, the partial cancellation that results can still significantly contribute to an improvement in the signal-to-noise ratio (SNR), contributing to data reception at high data rates while maintaining acceptably low bit-to-error ratios (BER's). Moreover, because a transceiver employing receiver circuitry illustrated by FIG. 1 has particularly good application for intra-chip, intra-device, and intra-apparatus communications, the physical construction and properties of the wireline media are often in the control of the designer so that delay skew can be minimized by thoughtful engineering.

Summing node 140 further receives an input signal from adaptive DFE block 180. The DFE is a Decision Feedback Equalizer. The DFE block 180 operates on the hard symbol value decisions 199 made in the immediate receiver circuit portion 100. DFE block 180 informs the soft symbol decision used by slicer 150 with a feed-back equalization signal provided through summing node 140. (Feed-forward equalization information is provided by adaptive equalizer 120.) The DFE block may be implemented in a mixed-signal IC design, for example, as a sliding-window reflection tap augmented circuit design with good results. In summary, summing node 140 receives the sampled equalized input signal, one NEXT filter signal for each transceiver in the cluster, one FEXT filter signal for each transceiver in the cluster except its own, and one feed-back equalization signal. The output of summing node 140 is a soft decision as to the received symbol value that proceeds to slicer 150 where a hard decision is made. The hard decision value appears at the output of the receiver circuit.

The hard symbol value decision for channel 1 presented at receiver output 104 may then be input to other processing circuitry such as a physical coding sublayer block (not shown in FIG. 1). Such a physical coding sublayer block may beneficially employ forward error correction (FEC), and that may beneficially implement block-code-based FEC in preference to convolutional type FEC. In one embodiment, a physical coding sublayer block with forward error correction is implemented in dedicated circuitry of the transceiver block. In another embodiment where transceiver blocks are ancillary to a principal functionality provided by an FPGA circuitry fabric, a physical coding sublayer block with forward error correction is implemented by configurable circuitry within the FPGA fabric. FPGA fabric, as used here, refers to a patterned layout of circuit blocks including a large proportion of programmable logic elements, interconnectable with an overlay of programmable signal routing resources. The fabric pattern often employs a small number of block designs with a large amount of repetition in one or both directions.

Upon study and reflection of the preceding detailed description one of ordinary skill in the art appreciates the novel receiver circuit and its attendant benefits. One of skill also appreciates that many options and alternatives exist for implementing such a circuit and its component functions. For example, while much of the functionality of the receiver circuit 100 embodiment was discussed in terms of continuous signal processing on a mixed-signal IC, much of that same functionality could be implemented in the digital domain in an embodiment utilizing a digital signal processor (DSP).

Figure 3:
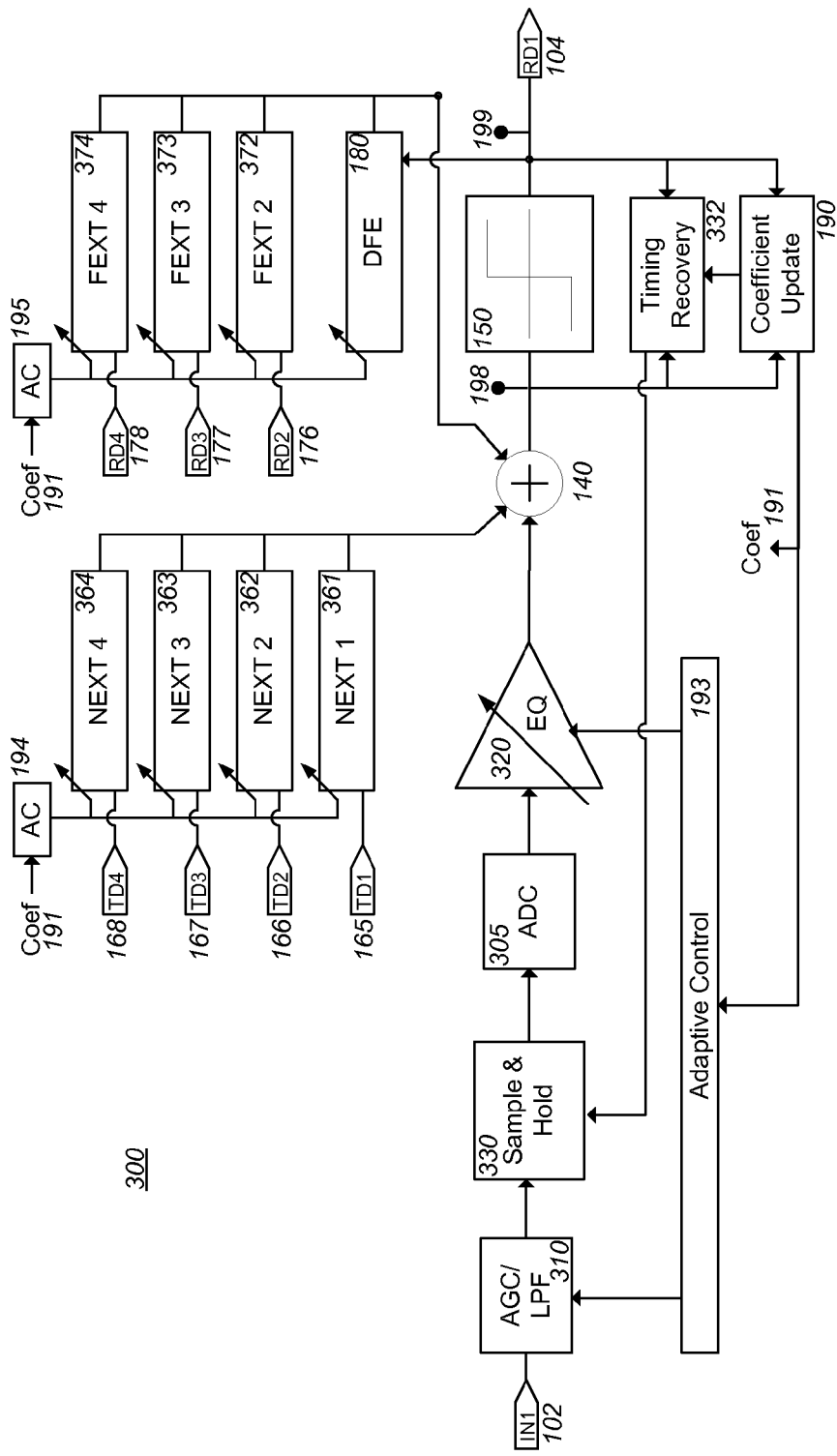
FIG. 3 is a functional circuit diagram of a receiver embodiment with adaptations for digital processing.

FIG. 3 is a functional circuit diagram of a receiver embodiment with adaptations for digital processing discussed in terms of digital processing by a DSP circuit. The similarities between receiver circuit portion 300 of FIG. 3 and receiver circuit portion 100 of FIG. 1 are apparent, and the reference numbers within each these figures appropriately parallel one another. FIG. 3, however, represents an embodiment with transceiver circuitry that includes a DSP and associated stored instruction memory to effect the desired functional processing (not shown independently). The discussion that follows will focus on differences in function blocks and their arrangement from that already discussed in relation to FIG. 1.

In FIG. 3, the automatic gain control block 310 is augmented to include a low pass filter (LPF) function. Equalization is postponed and the output of AGC/LPF block 310 passes to sample and hold circuit 330. Sample and hold circuit 330 has the same operation and control as that discussed in relation to sample and hold circuit 130 of FIG. 1. The held signal value presented at the output of block 330 is then quantized by analog-to-digital converter (ADC) 305. Adaptive equalizer 320 receives the output of ADC 305 and performs feed-forward equalization. In the presently described embodiment, adaptive equalizer circuit 320 is implemented using DSP circuitry and associated stored instruction memory circuitry.

Notably, sample and hold block 330 is driven by a symbol rate clock signal from timing recovery block 332 resulting in a relatively low data rate burden to ADC 305 and equalizer 320. Accordingly, the DSP implementing equalizer 320 can be shared among a multiplicity of function blocks within the IC and the cost of its silicon footprint distributed across that multiplicity. The result is a low effective die size cost for each function block in the multiplicity. In some embodiments a preference to use a DSP-based implementation of a receiver circuit such as 300 to provide ancillary communication function may arise from the availability of adequate processing bandwidth of an on-chip DSP placed into the design to support the principle IC functionality. The use of DSPs generally to implement circuit functionality is well understood in the art and one of skill readily appreciates the option to implement a variety of the function blocks of circuit 300 using a DSP. The same person of skill also readily appreciates other implementation options widely known in the art including, for example, dedicated digital logic.

Figure 4:
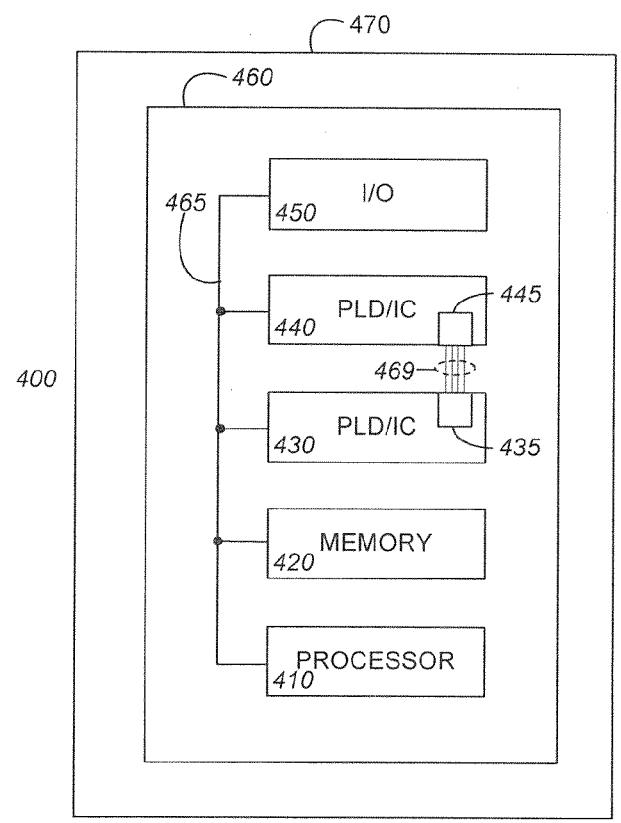
FIG. 4 is a block diagram of one end-user system.

FIG. 4 is a block diagram of one end-user system. An integrated circuit, such as a PLD, SOPC, or others, that includes channel transceivers with receiver circuitry such as that discussed in relation to FIGS. 1 and 3 may be used in many kinds of electronic devices. One possible use is in a data processing system such as data processing system 400 depicted in FIG. 4. Example data processing system 400 is shown to include a processor 410, a memory 420, PLD/IC components 430 and 440, and I/O circuitry 450. These components are coupled together by a system bus 465 and are populated on a circuit board 460 which is contained in an end-user system 470. The PLD/IC components 430 and 440 are further coupled to one another by a 4-channel high-speed wireline connection 469. Each of the PLD/ICs 430 and 440 has transceiver circuitry 435 and 445, respectively. Transceiver circuitry blocks 435 and 445 each includes a 4-transceiver cluster which attach at opposite ends of the wireline connection 469. Wireline connection 469 may be implemented as conductor traces of uniform length on circuit board 460. IC 430 uses its transceiver circuitry 435 to effect a high-speed four-channel communication lane with IC 440 using its transceiver circuitry 445. Each transceiver of 435 and 445 has a receiver circuit embodiment of which circuits 100 and 300 of FIGS. 1 and 3, respectively, are examples.

System 400 can be used in a wide variety of applications, such as computer networking, data networking, instrumentation, video processing, digital signal processing, or any other application where the advantage of using integrated circuits with ancillary high-speed communication capability is desirable. Where circuits 430 and 440 are PLD devices, such as an FPGA, each can be configured to perform a variety of different logic functions. For example, PLD/IC 430 can be configured as a processor or controller that works in cooperation with processor 401. As another example, PLD/IC 440 can be configured as an arbiter for arbitrating access to shared resources in system 400. In yet another example, each PLD/IC 430, 440 can be configured as an interface between processor 401 and one of the other components in system 400. It is noted that system 400 is only exemplary.

In another exemplary system, receiver circuit portion such as those described above can be used in systems in which a plurality of circuit boards are connected to a common backplane and data is transmitted between circuit boards across that backplane, or across optical interfaces that include optical fiber. A plurality of channels may be involved. Each circuit board may include one or more serial data channels, and there may be a plurality of boards. Thus, even if each board has only one channel, there still may be a plurality of channels across the backplane or optical interface.

Figure 5:
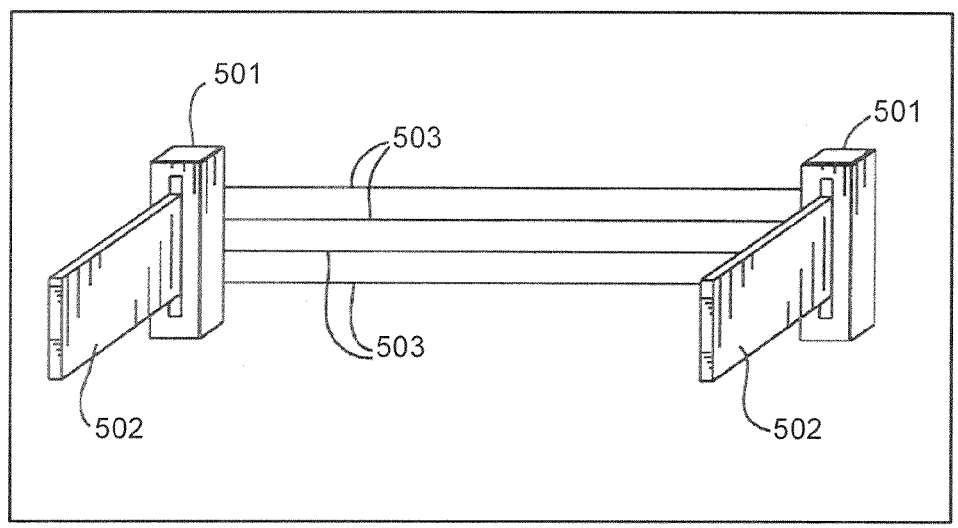
FIG. 5 is illustrates a back-plane employed in an end-user system.

FIG. 5 is illustrates a back-plane employed in an end-user system. Backplane 500 includes two connectors 501 each having a line card 502 mounted therein. A plurality of traces 503 cross the backplane carrying multiple data channels between the two line cards 502. In this example, because the geometry and other characteristics of the multiple data channels are preferably designed to eliminate delay skew between channels 503, ancillary transceiver circuitry on line cards 502 can provide maximal far-end crosstalk correction. The effectiveness of the ancillary transceiver circuitry precludes the need for specialty communications ICs, reducing component count, and reducing costs.

It will be understood that the foregoing is only illustrative of the principles of the inventive subject matter, and that various modifications can be made by those skilled in the art without departing from the scope and spirit of what has been invented. One skilled in the art will appreciate that the present invention can be practiced by other than the described embodiments, which are presented for purposes of illustration and not of limitation.

What is claimed is:

1. An integrated circuit having ancillary transceivers for use in a multi-channel communications lane, wherein a receiver circuit portion of a transceiver for a first channel of the multi-channel communications lane comprises:
    a symbol slicer with a symbol signal input coupled to summing circuitry having an input from an equalizer;
    a symbol rate adaptive near end cross talk (NEXT) filter for each lane channel with an output coupled to the summing circuitry;
    one or more adjustable far end cross talk (FEXT) filters each with an output coupled to an input of the summing circuitry, each of said FEXT filters respectively coupled to receive a symbol decision from one or more respective transceivers for respective channels other than the first channel in the multi-channel communications lane; and
    an adaptive control circuit coupled to the symbol rate adaptive NEXT filter, wherein the adaptive control circuit receives coefficients from a coefficient update circuit, and further wherein the symbol rate adaptive NEXT filter receives a control information signal from the adaptive control circuit,
    wherein the summing circuitry comprises a soft symbol signal output coupled to the coefficient update circuit.

2. The integrated circuit of claim 1 wherein each of said FEXT filters implements a finite impulse response function.

3. The integrated circuit of claim 1 wherein the symbol slicer comprises a hard symbol signal output, further wherein the hard symbol signal output is coupled to the coefficient update circuit.

4. The integrated circuit of claim 3 wherein the soft symbol signal output is coupled to the symbol slicer.

5. An integrated circuit with high speed data signaling, comprising:
    a plurality of data transceiver circuits each associated with a respective lane channel of a first multi-channel communications lane and each having a receiver with a lane channel signal input, and wherein each receiver comprises:
        a feedforward adaptive equalizer with an output coupled to a summing circuit;
        a symbol rate adaptive near end cross talk (NEXT) filter for each lane channel with an output coupled to said summing circuit;

a symbol rate adaptive far end cross talk (FEXT) filter for each lane channel other than the receiver channel with an output coupled to said summing circuit, each symbol rate adaptive FEXT filter being respectively coupled to receive a symbol decision from a respective one of one or more respective data transceiver circuits associated with one or more respective lane channels other than the receiver channel;

a feedbackward adaptive equalizer with an output coupled to said summing circuit; and an adaptive control circuit coupled to the symbol rate adaptive NEXT filter, wherein the adaptive control circuit receives coefficients from a coefficient update circuit, and further wherein the symbol rate adaptive NEXT filter receives a control information signal from the adaptive control circuit, wherein said summing circuit comprises a soft symbol signal output coupled to a slicer circuit, wherein said slicer circuit comprises a hard symbol signal output, and further wherein the soft symbol signal output and the hard symbol signal output are further coupled to the coefficient update circuit.

6. The integrated circuit of claim 5 wherein said FEXT filter implements a finite impulse response function.

7. The integrated circuit of claim 5 wherein the soft symbol signal output and the hard symbol signal output are coupled to a timing recovery circuit.

8. An integrated circuit comprising:
first circuitry associated with principal functionality and occupying a majority of the die area of the integrated circuit;
second circuitry for effecting a high-speed multi-channel communication lane and adapted for coupling to said first circuitry, said second circuitry comprising a receiver circuit associated with a first channel, said receiver circuit comprising:
a symbol slicer with a soft symbol input and a hard symbol output;
a summing circuit with an output coupled to said soft symbol input and with first, second, third, fourth, and fifth inputs;
a feedforward equalizer circuit having an output coupled to said first input;
a first adjustable filter having an output coupled to said second input and having an input adapted for a transmit symbol signal associated with said first channel;
a second adjustable filter having an output coupled to said third input and having an input adapted for a transmit symbol signal associated with a second channel;
a third adjustable filter having an output coupled to said fourth input and having an input adapted for a receive hard symbol decision signal associated with said second channel;
an adjustable feedback equalizer having an output coupled to said fifth input and having an input adapted for a receive symbol signal associated with said first channel; and
an adaptive control circuit coupled to the first adjustable filter, the second adjustable filter, the third adjustable filter, and the adjustable feedback equalizer, wherein the adaptive control circuit receives coefficients from a coefficient update circuit, and further wherein the first adjustable filter, the second adjustable filter, and the third adjustable filter receive a control information signal from the adaptive control circuit, wherein signals presented at the soft symbol input and the hard symbol output of the slicer are further coupled to the coefficient update circuit.

9. The integrated circuit of claim 8 wherein each of said first, second, and third adjustable filters implements a finite impulse response function.

10. The integrated circuit of claim 8 wherein the signals presented at the soft symbol input and the hard symbol output of the slicer are further coupled to a timing recovery circuit.

11. A method for ancillary multi-channel data communications for an integrated circuit as applied to a first channel of a multi-channel communications lane, the method comprising:
adaptively equalizing in a receiver an input signal representing data for the first channel of the multi-channel communications lane to produce a feedforward signal;
adaptively filtering in said receiver at symbol rate for near-end crosstalk (NEXT) for each channel in said multi-channel communications lane to produce a NEXT signal corresponding to each respective channel, wherein the adaptively filtering is at least in part in response to receiving an adaptive control information from an adaptive control circuit, wherein the adaptive control circuit receives coefficients from a coefficient update circuit, wherein a soft symbol signal output of a summing circuitry is coupled to the coefficient update circuit, and further wherein a symbol rate adaptive NEXT filter receives a control information signal from the adaptive control circuit;
adaptively filtering in said receiver at symbol rate for far-end crosstalk for each channel other than said first channel in said multi-channel communications lane to produce a FEXT signal corresponding to each respective channel, wherein the adaptive filtering uses a symbol decision from each channel other than the first channel;
adaptively equalizing in said receiver at symbol rate for said first channel to produce a feedbackward signal; and
generating a received symbol signal based at least in part on said feedforward signal, said NEXT signal, said FEXT signal, and said feedbackward signal.

12. The method of claim 11 wherein a hard symbol signal output of a slicer circuit is coupled to the coefficient update circuit.

13. The method of claim 12 wherein the soft symbol signal output is coupled to the slicer circuit.

14. An electronic apparatus employing high speed data signaling, comprising:
a first integrated circuit having a plurality of data transmitter circuits each having a lane channel signal output;
a second integrated circuit having a plurality of data transceiver circuits each having a receiver with a lane channel signal input;
a plurality of wirelines together coupling each signal output to a respective signal input;
wherein said receiver comprises:
a feedforward adaptive equalizer with an output coupled to a summing circuit,
a symbol rate adaptive near end cross talk (NEXT) filter for each lane channel with an output coupled to said summing circuit,
a symbol rate adaptive far end cross talk (FEXT) filter for each lane channel other than the receiver channel with an output coupled to said summing circuit and an input coupled to receive a symbol decision from each lane channel other than the receiver channel,
a feedbackward adaptive equalizer with an output coupled to said summing circuit, and an adaptive control circuit coupled to the symbol rate adaptive NEXT filter, wherein the adaptive control circuit receives coefficients from a coefficient update circuit, and further wherein the symbol rate adaptive NEXT filter receives a control information signal from the adaptive control circuit, wherein the summing circuit comprises a soft symbol signal output coupled to the coefficient update circuit.

15. The apparatus of claim 14 wherein said first and second integrated circuits are mounted on a single printed circuit board.

16. The apparatus of claim 15 wherein said wirelines comprise traces on said printed circuit board.

17. The apparatus of claim 14 wherein said receiver comprises a slicer circuit including a hard symbol signal output, further wherein the hard symbol signal output is coupled to the coefficient update circuit.

18. The apparatus of claim 17 wherein the soft symbol signal output is coupled to the slicer circuit.

19. A system incorporating a backplane for high speed multi-channel data communications lanes, comprising:

first and second connectors, each connector comprising a plurality of contacts;

a plurality of conductors coupling said contacts of said first connector with corresponding contacts of said second connector;

a first circuit card assembly attached to said first connector and having a first integrated circuit having a plurality of data transmitter circuits each having a lane channel signal output;

a second circuit card assembly attached to said second connector and having a second integrated circuit having a plurality of data transceiver circuits each having a receiver with a lane channel signal input;

wherein each lane channel signal output is coupled to a respective lane channel signal input by one or more of said plurality of conductors and said first and second connectors; and wherein said receiver comprises:

a feedforward adaptive equalizer with an output coupled to a summing circuit, a symbol rate adaptive near end cross talk (NEXT) filter for each lane channel with an output coupled to said summing circuit, a symbol rate adaptive far end cross talk (FEXT) filter for each respective lane channel other than the receiver lane channel with an input coupled to receive a symbol decision from the respective lane channel other than the receiver lane channel and with an output coupled to said summing circuit, a feedbackward adaptive equalizer with an output coupled to said summing circuit, and an adaptive control circuit coupled to the symbol rate adaptive NEXT filter, wherein the adaptive control circuit receives coefficients from a coefficient update circuit, and further wherein the symbol rate adaptive NEXT filter receives a control information signal from the adaptive control circuit, wherein the summing circuit comprises a soft symbol signal output coupled to the coefficient update circuit.

20. The system of claim 19 wherein said receiver comprises a slicer circuit including a hard symbol signal output, further wherein the hard symbol signal output is coupled to the coefficient update circuit.

21. The system of claim 20 wherein the soft symbol signal output is coupled to the slicer circuit.

* * * * *